United States Patent
Maturana et al.

(10) Patent No.: US 12,088,614 B2
(45) Date of Patent: Sep. 10, 2024

(54) SYSTEMS AND METHODS FOR DETECTING ANOMALIES IN NETWORK COMMUNICATION

(71) Applicant: Rockwell Automation Technologies, Inc., Mayfield Heights, OH (US)

(72) Inventors: Francisco P. Maturana, Lyndhurst, OH (US); Robert Nunoo, Mundelein, IL (US); Peter A. Armstrong, Brookfield, WI (US); Jay W. Schiele, Union Grove, WI (US); Dennis J. Luo, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 343 days.

(21) Appl. No.: 17/038,852

(22) Filed: Sep. 30, 2020

(65) Prior Publication Data

US 2022/0103591 A1    Mar. 31, 2022

(51) Int. Cl.
   *H04L 9/40*   (2022.01)
   *G05B 19/4155*   (2006.01)
   *G06N 20/00*   (2019.01)

(52) U.S. Cl.
   CPC ...... *H04L 63/1433* (2013.01); *G05B 19/4155* (2013.01); *G06N 20/00* (2019.01); *H04L 63/1425* (2013.01); *G05B 2219/31368* (2013.01)

(58) Field of Classification Search
   CPC . H04L 63/1433; H04L 63/1425; G06N 20/00; G05B 19/4155; G05B 2219/31368; G06F 21/44
   See application file for complete search history.

(56) References Cited

U.S. PATENT DOCUMENTS

| 10,956,808 B1* | 3/2021 | Bhardwaj | G06N 3/045 |
| 2012/0210158 A1 | 8/2012 | Akiyama et al. | |
| 2016/0191559 A1* | 6/2016 | Mhatre | G06F 11/00 726/23 |

(Continued)

FOREIGN PATENT DOCUMENTS

| EP | 3618354 A1 | 3/2020 |
| WO | 2016073383 A1 | 5/2016 |

OTHER PUBLICATIONS

Title: A survey on application of machine learning for Internet of Things Author(s): Laizhong Cui, Shu Yang, Fei Chen, Zhong Ming Year: 2018 Publisher: Springer.*

(Continued)

*Primary Examiner* — Shahriar Zarrineh
*Assistant Examiner* — Gita Faramarzi
(74) *Attorney, Agent, or Firm* — Fletcher Yoder, P.C.

(57) ABSTRACT

Systems and methods for detecting anomalies in network communication in an industrial automation system. An anomaly detection system, a decentralized system, may identify IoT devices within the network communication and corresponding communication metrics. Using the communication metrics between the identified IoT devices, the anomaly detection system may generate a social network model that is indicative of expected network communication properties. By analyzing social network metrics and overall entropy of the network communication in real time, the anomaly detection system may identify anomalies that may be associated with potential network vulnerabilities.

20 Claims, 6 Drawing Sheets

(56) References Cited

U.S. PATENT DOCUMENTS

| | | | | |
|---|---|---|---|---|
| 2016/0261482 A1* | 9/2016 | Mixer | ................... | H04L 43/12 |
| 2016/0352766 A1* | 12/2016 | Flacher | ................... | H04L 12/28 |
| 2019/0347418 A1* | 11/2019 | Strogov | ................... | G06F 21/44 |
| 2020/0177485 A1* | 6/2020 | Shurtleff | ................ | H04L 41/142 |
| 2020/0334278 A1* | 10/2020 | Ascough | .................. | G06N 3/04 |
| 2021/0006622 A1* | 1/2021 | Knight | ................. | G05B 19/048 |
| 2021/0065063 A1* | 3/2021 | Gazzetti | ................. | G06N 20/20 |
| 2021/0223397 A1* | 7/2021 | Bertoni | .................. | G01B 11/25 |
| 2022/0044949 A1* | 2/2022 | Korb | ................... | G06F 18/214 |
| 2022/0067737 A1* | 3/2022 | Wittenbach | ......... | G06Q 20/4016 |
| 2022/0201026 A1* | 6/2022 | Wen | ................... | H04L 63/1425 |

OTHER PUBLICATIONS

European Search Report for European Application No. 21198857.1 dated Jan. 21, 2022, 9 Pages.

\* cited by examiner

SYSTEMS AND METHODS FOR DETECTING ANOMALIES IN NETWORK COMMUNICATION

BACKGROUND

The present disclosure is generally directed to techniques for detecting anomalies in network communication. More specifically, the present disclosure relates to techniques for using detected anomalies to understand network communication traffic and unveil security threats that may establish network vulnerabilities, which may be exploited by malicious actors.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, these statements are to be read in this light, and not as admissions of prior art.

An industrial automation system may include any suitable Internet of Things (IoT) system that supports manufacturing processes and enables data transfer between interrelated computing devices, machines, databases, and other IoT devices. However, network vulnerabilities, software or hardware flaws within the IoT devices, may result in data breaches or security threats within the IoT system, which may emerge from external or internal malicious actions. As such, improved systems and methods for detecting such malicious actions and network vulnerabilities in real time are desirable.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a non-transitory computer-readable medium may include instructions that cause a processor to receive data associated with network communication from a plurality of devices in an industrial automation system. The processor may also identify one or more communication patterns within the network communication based on the data, identify one or more devices of the plurality of devices based on one or more identifiers associated with the one or more communication patterns, and determine one or more communication metrics between the one or more devices using the one or more communication patterns. The processor may then generate a network model based the one or more devices and the one or more communication metrics, such that the network model is representative of one or more expected properties of the network communication of the one or more devices. The processor may also perform an analysis of the network communication using one or more network metrics based on the network model with respect to time, detect one or more anomalies in the network communication using the analysis, and send a notification to a computing device in response to detecting the one or more anomalies.

In a further embodiment, a method may include receiving, via a processor, data associated with network communication from a plurality of devices in an industrial automation system. The method may also involve identifying one or more communication patterns within the network communication based on the data, identifying one or more devices of the plurality of devices based on one or more identifiers associated with the one or more communication patterns, and determining one or more communication metrics between the one or more devices using the one or more communication patterns. The method may then involve generating a network model based the one or more devices and the one or more communication metrics, such that the network model is representative of one or more expected properties of the network communication of the one or more devices. The method may involve performing an analysis of the network communication using one or more network metrics based on the network model with respect to time, detecting one or more anomalies in the network communication using the analysis, and sending a notification to a computing device in response to detecting the one or more anomalies.

In an additional embodiment, a non-transitory computer-readable medium may include computer-executable instructions that cause one or more processors to receive data associated with network communication from a plurality of devices in an industrial automation system and identify one or more anomalies within the data based on a comparison between the data and a network model representative of one or more expected properties of the network communication of one or more devices of the plurality of devices. The processors may then retrieve at least one annotation associated with the one or more anomalies, such that the at least one annotation corresponds to one or more commands may adjust a first operation of a first device of the one or more devices, and send the one or more commands to the first device.

BRIEF DESCRIPTION OF THE DRAWINGS

These and other features, aspects, and advantages of the presently disclosed embodiments will become better understood when the following detailed description is read with reference to the accompanying drawings in which like characters represent like parts throughout the drawings, wherein.

DETAILED DESCRIPTION

Figure 1:
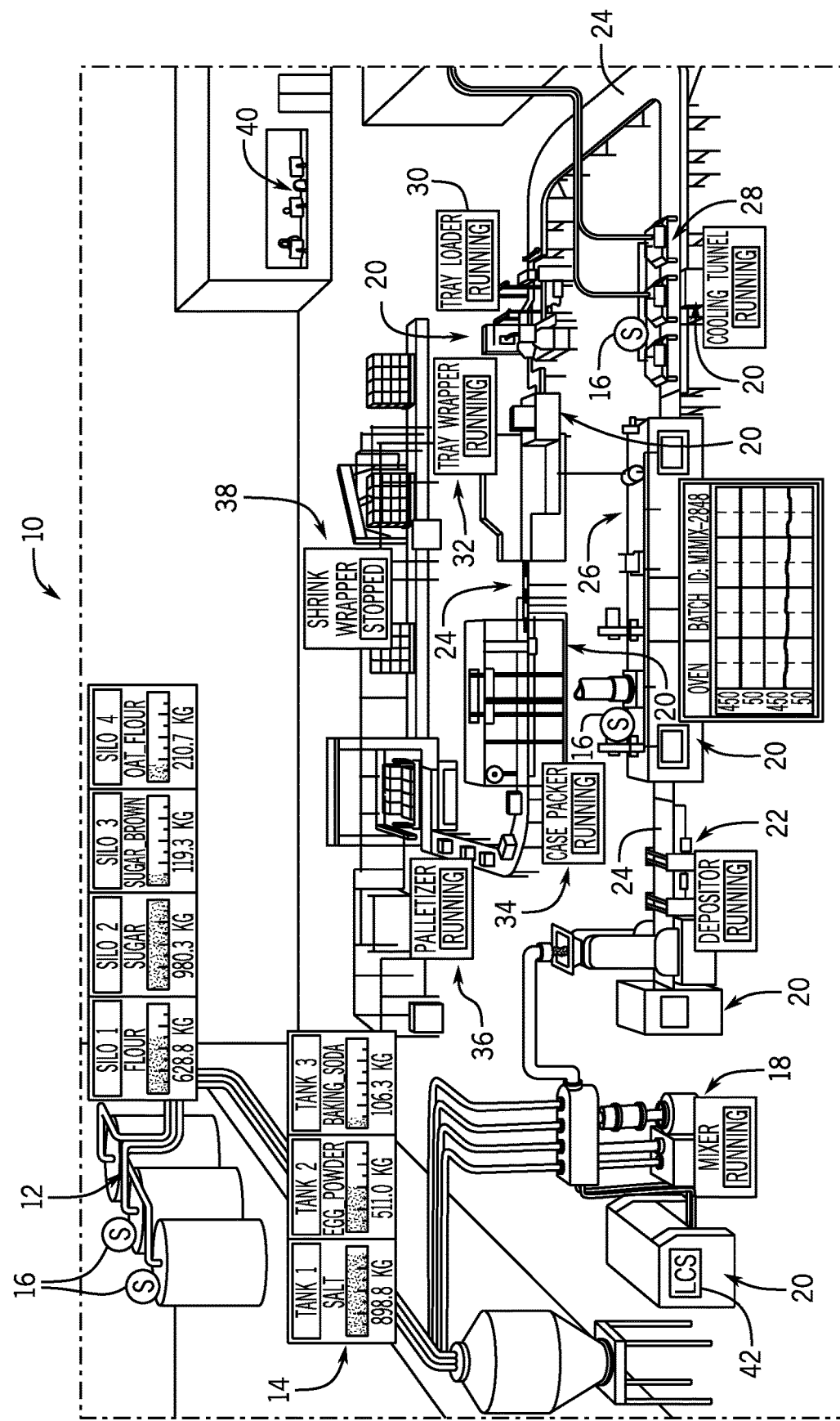
FIG. 1 illustrates an example industrial automation system employed by a food manufacturer, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification.

As discussed above, network vulnerabilities, software or hardware flaws within the IoT devices, may result in data breaches or security threats within the IoT system, which may emerge from external or internal malicious actions. As such, in some embodiments, malicious actions and network vulnerabilities may be identified by detecting changes in network communication that deviate from a set of pre-defined network rules. The predefined network rules, which define expected network communication patterns within the IoT system, may be determined based on analyzing historical data related to patterns in data transfers and interactions between IoT devices over time. However, analyzing numerous sets of historical network data to determine the predefined rules may be inefficient in terms of complexity of the predefined rules (e.g., implementing the predefined rules may encompass numerous combinations that an actor or IoT device may use), processing power, usage of resources, time, and cost. Further, the predefined rules may not be updated in real-time as new network communication patterns develop within the IoT system.

Keeping this in mind, the present embodiments described herein may include improved systems and methods for identifying or detecting network anomalies that may be annotated or attributed to certain events (e.g., security threat, cyber-security threat, safety condition, data quality issues). That is, the embodiments described herein may characterize expected network communication traffic according to certain metrics (e.g., density, centricity, propensity, entropy), which may be derived via a network model representative of the expected network communication traffic between devices in an industrial system. As anomalies are detected with respect to the metrics derived from the network model, the present embodiments may include annotating or characterizing the detected anomaly to a particular type of event, which may be isolated and filtered out to identify specific segments of the network communication being affected at runtime. The annotation, in some embodiments, may include instructions or details for a course of action to be implemented to secure the devices in the industrial system from being vulnerable from certain threats. In addition, the annotation may include instructions to perform certain pro-active operations (e.g., opening circuit breakers) to ensure that personnel maintaining or operating with the devices in the industrial system are safe. Additional details with regard to using anomalies in network communication to better identify and resolve issues that may be present in the industrial system are described below with reference to FIGS. 1-6.

By way of introduction, FIG. 1 illustrates an example industrial automation system 10 employed by a food manufacturer in which the present embodiments may be implemented. It should be noted that although the example industrial automation system 10 of FIG. 1 is directed at a food manufacturer, the present embodiments described herein may be employed within any suitable industry, such as automotive, IT, mining, hydrocarbon production, manufacturing, and the like. That is, industrial automation systems may be used in various contexts, such as a manufacturing plant, a resource extraction system, a hydrocarbon extraction site, a chemical refinery facility, an industrial plant, a power generation system, a mining system, a brewery, or the like. For example, in a resource extraction system context, a control system may control load and position of a rod pump to perform an oil extraction process. Although examples are provided with regard to specific contexts, one of ordinary skill in the art will recognize that these examples are not intended to be limiting and that the techniques described herein can be used with any suitable context.

With this in mind, the following brief description of the example industrial automation system 10 employed by the food manufacturer is provided herein to help facilitate a more comprehensive understanding of how the embodiments described herein may be applied to components and a manufacturing application system to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials may be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, firewall, network switches (e.g., Ethernet switches, modular-managed, fixed-managed, service-router, industrial, unmanaged, etc.) and the like. The industrial automation devices 20, the mixer 18, and other machines are examples of components in the industrial automation system 10.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

The industrial automation devices 20 (e.g., components) may be used to provide power to the machinery used to perform certain tasks, provide protection to the machinery from electrical surges, prevent injuries from occurring with human operators in the industrial automation system 10, monitor the operations of the respective device, communicate data regarding the respective device to an anomaly detection system 40, and the like. Using the anomaly detection system 40, human operators of the industrial automation system 10 may be able to discover potential network communication threats or malicious actions.

The anomaly detection system 40 may include a human machine interface (HMI) and a control/monitoring device or automation controller adapted to interface with devices that may monitor network communication of various types of industrial automation devices 20 or components. It should be noted that the HMI and the control/monitoring device, in accordance with embodiments of the present techniques, may be facilitated using certain network strategies. Indeed, an industry standard network may be employed, such as DeviceNet, to enable data transfer. Such networks permit the exchange of data in accordance with a predefined protocol and may provide power for operation of networked elements.

In certain embodiments, the industrial automation devices 20 (e.g., components) may include a communication feature that enables the industrial automation devices 20 (e.g., components) to communicate data between each other and other devices. The communication feature may include a network interface that may enable the industrial automation devices 20 (e.g., components) to communicate via various protocols such as Ethernet/IP®, ControlNet®, DeviceNet®, or any other industrial communication network protocol. Alternatively, the communication feature may enable the industrial automation devices 20 (e.g., components) to communicate via various wired or wireless communication protocols, such as Wi-Fi, mobile telecommunications technology (e.g., 2G, 3G, 4G, LTE, 5G), Bluetooth®, near-field communications technology, and the like.

Regardless of the type of communication protocol employed by the industrial automation devices 20, the present embodiments described herein may monitor and characterize the communications between the industrial automation devices 20 as a network model to facilitate the identification of network communication anomalies. That is, in one embodiment, the anomaly detection system 40 may be communicatively coupled to a computing device (e.g., smart phone) and/or a cloud-based computing system of a user. As such, a notification indicating detected anomalies and relevant data may be communicated to the computing device and/or the cloud-based computing system from the anomaly detection system 40. In certain embodiments, the anomaly detection system 40 may perform certain operations and analysis without sending data to the computing device and/or the cloud-based computing system associated with security personnel or human operators of the industrial automation device 10.

As mentioned above, an industrial automation system (e.g., industrial automation system 10) may include any suitable Internet of Things (IoT) system including those that support manufacturing processes and enables data transfer between interrelated computing devices, machines, databases, and other IoT devices. However, network vulnerabilities, software or hardware flaws within the IoT devices, may result in data breaches or security threats within the IoT system. These vulnerabilities may be exposed by external or internal malicious actions. Such malicious actions and network vulnerabilities may be identified by detecting changes in network communication that deviate from a set of predefined network rules via a centralized system. The predefined network rules, which define expected network communication patterns within the IoT system, may be determined based on analyzing historical data related to patterns in data transfers and interactions between IoT devices over time.

However, analyzing numerous sets of historical network data to determine the predefined rules may be inefficient in terms of complexity of the predefined rules, processing power, usage of resources, time, and cost. Further, the centralized system may not be able to update the predefined rules in real-time as new network communication patterns develop within the IoT system. As such, maintaining the centralized system long-term becomes expensive and cumbersome due to computational specifications that increasingly dependency on legacy and monolithic analytics tools to establish the predefined rules.

Keeping this in mind, to efficiently determine network vulnerabilities in an IoT system in real-time from a large amount of IoT network data, the anomaly detection system 40 may be used to detect network anomalies or changes in network communication that may be indicative of potential network threats. Unlike the centralized system mentioned above, the anomaly detection system 40 may include a decentralized, reconfigurable system that does not depend on historical sets of data to evaluate changes in network communication. Instead, the anomaly detection system 40 may dynamically detect anomalies from network communication data (e.g., IoT network data) by continuously learning and determining new communication patterns from the network communication data. That is, the anomaly detection system 40 may generate an actor model representative of actions performed by an individual device and a social network model representative of communications between various, as well as evaluating overall entropy of the network communication to detect anomalies.

In some embodiments, the anomaly detection system 40 may be communicatively coupled vulnerabilities analytics agents (VAAs) that are strategically located throughout the various levels of the industrial automation system 10 to continuously collect via IoT network data from various levels of the industrial automation system 10. The vulnerabilities analytics agents (VAAs) may be coupled to a network of nodes or respective IoT devices within the IoT system of the industrial automation system 10. The vulnerabilities analytics agents (VAAs) may be coupled to an observer agent that receives the IoT network data collected by the vulnerabilities analytics agents (VAAs). Vulnerabilities analytics agents (VAAs) may exchange information with each other to sum their respective anomaly detections into a concluding observation that pin points the areas being affected. The IoT network data may include information related to the communication and interactions between various IoT devices and nodes within the various levels of the IoT system within the industrial automation system 10. The information may include the type of communication protocols used between devices, the type of data communicated between the devices, the times at which data is communicated between devices, the size of the payload of the communicated data, the frequency of exchanges between the devices, and the like.

After receiving the IoT network data, the observer agent of the VAAs, a processor, or other similar component may deconstruct the IoT data via a packet demultiplexer to identify particular actors involved in the network communication based on respective unique identifiers (e.g., MAC addresses). The actors may be IoT devices (e.g., machines, computing devices, servers) that contribute to the network communication within the IoT system. The packet demultiplexer separates various communication signals or signatures from the IoT network data into to their corresponding actors (e.g., receivers, transmitters). Based on organizing and demultiplexing the IoT network data, the observer agent may create a baseline truth for deducting relationships and communication network patterns. The baseline truth may include communication trends or patterns identified from the IoT network data via the observer agent.

In addition to identifying the MAC address of each IoT device to determine actors within the network communication, the observer agent may also determine the type of IoT device based on the MAC address, lookup tables, and/or or other sources of information that provide device contextualization. Device contextualization may involve determining the type IoT device based on usage and application context of respective IoT devices. For example, the observer agent may identify that a particular IoT device is a controller, a PC device, or so forth based on correlating a type of device from the lookup tables to the MAC address. The observer agent may also leverage other properties such as geolocation and user role associated with each IoT device in determining actors within the network communication. The user role indicates which user(s) may be accessing or operating the particular IoT device during a particular time period.

After types of IoT devices (e.g., actors) and their respective properties are identified within the network communication, the observer agent may send the baseline truth and data related to the identified actors to a metrics generator. The metrics generator may be another processor or processing component that determines communication patterns between the identified actors. For example, the metrics generator may determine the type, duration, an amount of communication amongst the IoT devices, and the like. The metrics generator may also extract metrics related to communication between the IoT devices from the baseline truth. Non-limiting examples of the metrics may include number of messages per unit time, data volume, duration of communication, count (e.g., number of connections to the same host), source error rate, and destination error rate.

Metrics may be extracted or calculated from communication activity at the actor level. The communication activity may include communication links, data volume, time of communication, duration of communication, and so for forth. As further described below, the communication activity is translated into quantifiable factors (e.g., metrics) that are used to establish a social network model and evaluate network entropy. The metrics generator may store the metrics in a singular vector that is evaluated to determine variations in the actor behavior by analyzing patterns and detecting outliers that originate from the variations. Based on identifying particular IoT devices and the metrics related to communication between the particular IoT devices, an actor model may be generated. The actor model may represent the particular IoT devices within the network communication and the communication metrics between the particular IoT devices. Aspects related to defining the actors may be added to the overall actor model incrementally, and depending on the context of various applications, such aspects may change in complexity and extent.

With the preceding in mind, the metrics derived from the actor model may be used to develop a social network model, which may define expected properties of the network communication amongst the IoT devices. Social network metrics such as centrality, density, and modularity may be used to analyze the interactions between the identified IoT devices (e.g., actors). Density may indicate a potential of network connections, centrality may indicate major or primary actors (e.g., actors that participate in more than a threshold amount of communications) within the network communication, and modularity may define the structure of the social network. Further, entropy, an overall metric calculation that includes the observed uncertainty within system communication, may be evaluated. For example, entropy may indicate the level of uncertainty or uncharacteristic nature of the network communication.

A social network analyzer may organize entropy and other social network metrics with respect to time using a time-series generator. In turn, using machine-learning algorithms (e.g., Kalman filter, ARIMA), the social network analyzer may generate a state-space model of the time-series based social network metrics to identify time-series patterns (e.g., network communication and behaviors of the identified IoT devices during particular time periods). Using the time-series patterns from the state-space model, the anomaly detection system 40, via the social network analyzer, may predict anomalies within network communication of the IoT system. For example, based on analyzing entropy of the network communication, the social network analyzer may indicate that a change to the network communication may result in the network communication deviating from the expected properties of the social network model.

The social network model and entropy calculations may include inline calculations that may be computed without big data accumulation. By enabling dynamic construction of actor and social network models, the anomaly detection system 40 may not rely on evaluating historical data, which may be cumbersome and computationally expensive or inefficient (e.g., involving more processing power). Further, dynamically generating models and calculating entropy are also compatible with other approaches for detecting network vulnerabilities.

Examples of a change to the network communication may include a new actor being added to the IoT system, changes in communication patterns between actors within the IoT system, a software or hardware change to the IoT devices, and so forth. As such, the anomaly system may detect such variations or anomalies when the corresponding network communication changes. In some embodiments, a user (e.g., human operator of the industrial automation system 10) or security personnel may be notified regarding the anomalies via a notification sent to user devices (e.g., smartphone). Based on analyzing the anomalies, the user may determine whether one or more identifies anomalies are associated with an external network threat, a network vulnerability, internal issue within the industrial automation system, and so forth.

In some embodiments, the anomaly detection system 40 may assist the user in understanding the origin of the anomalies to make accurate decisions to address potential network issues associated with the identified anomalies. For example, a user may flag an anomaly as a network vulnerability based on analyzing the entropy and determining an uncharacteristic nature of the network communication relative to the social network model. In addition to flagging anomalies as network vulnerabilities, the user may provide annotations into the anomaly detection system 40 for the flagged anomalies. The annotations may include user notes, decisions, commands, and other instructions for analyzing and addressing particular anomalies. In some embodiments, as annotations provided by a number of users for various anomalies are accumulated over time, the anomaly detection system 40 may automatically specify how a respective anomaly should be resolved rather than the user.

Further, each IoT device or identified anomaly may be associated with several recurring patterns of behavior that may be stored and used to train a machine learning module or artificial intelligence (AI) component that may be part of the respective vulnerability analytics agent (VAA). New actors may add variations to the network communication, but it is expected that such variation would still map to the expected patterns. The anomaly detection system 40 may be able to pinpoint variations and flag particular variations as anomalies. The anomaly detection system 40 may notify a client device regarding the detected anomalies such that the detected anomalies may be addressed before the IoT system may encounter potential data breaches or security issues due to the anomalies in network communication.

Additionally, the state-space model may be updated in response to the anomaly detection system 40 receiving new communication data and identifying new network communication patterns and behavior. Continuously updating the state-space model as new network communication patterns are identified may improve accuracy in detecting anomalies. Detected anomalies may result in alerts being generated or proactive commands being sent to certain components to deny access to other components to keep data secure.

Figure 2:
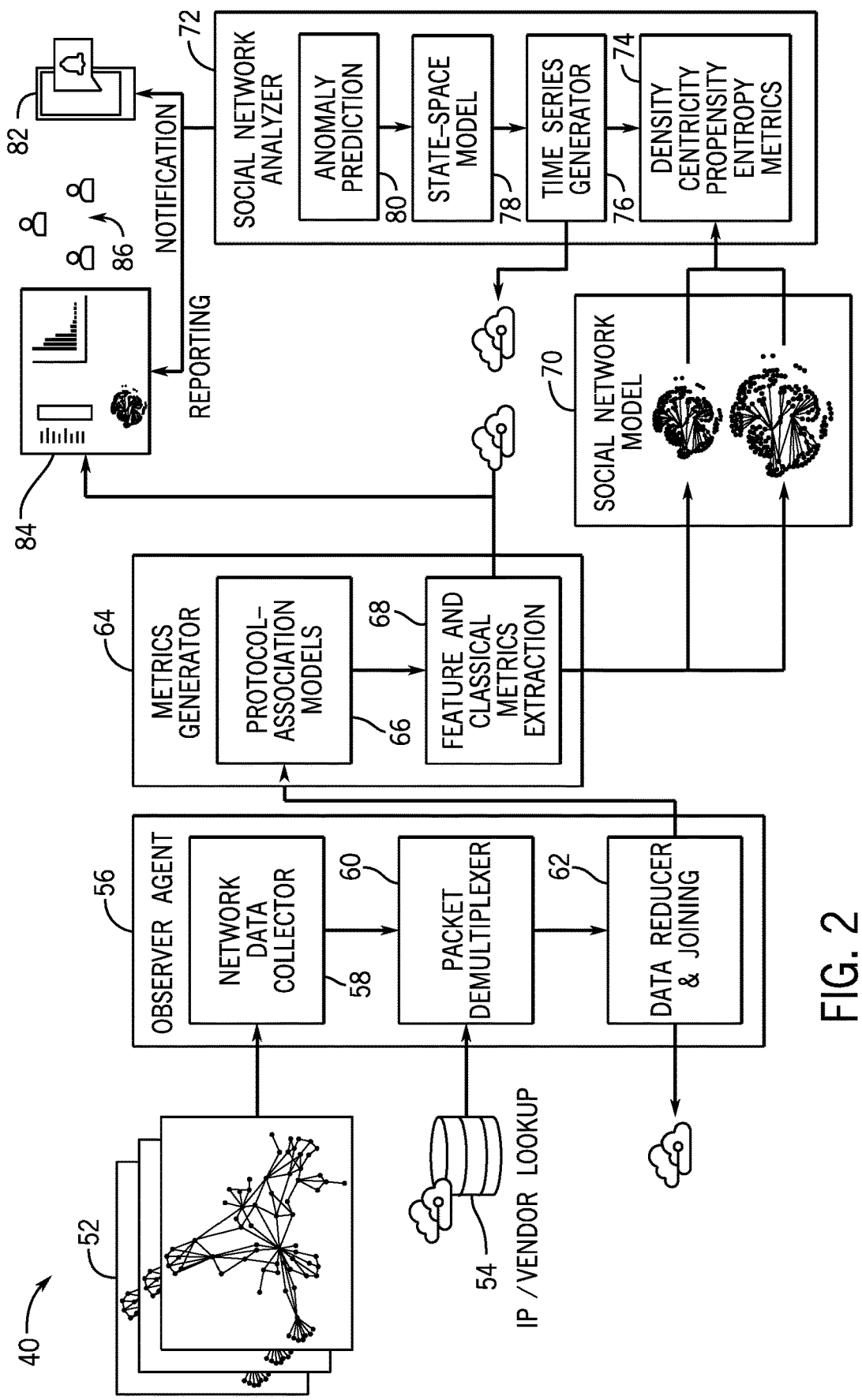
FIG. 2 illustrates a block diagram of an anomaly detection system, in accordance with an embodiment of the present disclosure.

With the foregoing in mind, FIG. 2 illustrates a block diagram of the anomaly detection system 40 that may perform the operations described above. Non-limiting components of the anomaly detection system include the observer agent 56, a metrics generator 64, and a social network analyzer 72. Each IoT device (e.g., industrial automation device 20) within the IoT system of the industrial automation system 10 may contribute to the overall network communication. As such, each IoT device may be associated with a communication signature that indicates respective level, type, and other parameter related to communication. Such communication signatures and network interactions may be referred to as the IoT network data. As used herein, the IoT network data may include information related to the communication and interactions between various IoT devices and nodes within the various levels of the IoT system within the industrial automation system 10.

As mentioned above, the IoT network data 52 from various levels of the industrial automation system 10 may be continuously collected via vulnerabilities analytics agents (VAAs) that are strategically located throughout the various levels of the industrial automation system 10. The vulnerabilities analytics agents (VAAs), data collectors, may send the collected IoT network data to a network data collector 58 of the observer agent 56. The observer agent 56 include one or more processors related to the network data collector 58, a packet demultiplexer 60, and a data reducer and joining component 62.

After receiving the IoT network data, the network data collector 58 may organize the IoT network data into one or more data packets that may be analyzed for network communication patterns and trends. Based on the organized one or more data packets, the observer agent 56 may deconstruct the communication data via the packet demultiplexer 60 to identify particular actors involved in the network communication based on respective unique identifiers (e.g., MAC addresses). The packet demultiplexer 60 separates various communication signals or signatures from the IoT network data into to their corresponding actors (e.g., receivers, transmitters) using the lookup tables 54. Using an address lookup table, the packet demultiplexer 60 may identity a MAC address for a particular communication signature. Based on the identified MAC address and use of a vendor lookup table, the packet demultiplexer 60 may identify a manufacturer or vendor associated with the particular communication signature. The communication signature may indicate device usage and application in context of a respective IoT device. Additionally, the packet demultiplexer 60 may identity a type of device associated with the particular communication signature using a device registry. For example, the observer agent may identify that a particular IoT device is a controller, a PC device, or so forth based on correlating a type of device from the device registry to the identified MAC address. The observer agent may also leverage other properties such as geolocation and user role associated with each IoT device in determining actors within the network communication. The user role indicates which user(s) and the number of users that may be accessing or operating the particular IoT device during a particular time period.

Based on the MAC address, vendor, type of device, geolocation, user role, and the like identified for each IoT device, the observer agent 56 may determine whether each identified IoT device is valid and/or authorized to operate in the industrial automation system 10 (block 116). If the identified IoT device is not valid, then the observer agent 56 may send an alert the user 86 regarding the validity with the identified IoT device. Based on valid identified IoT devices, the observer agent 56 may create a baseline truth for deducting relationships and communication network patterns. The baseline truth may include communication trends or patterns associated with the identified actors. For example, the observer agent 56 may determine communication patterns and links such as inter-links and intra-links amongst the identified IoT devices. The intra-links between the IoT devices may refer to communication patterns between IoT devices of a single level (e.g., enterprise network level) of the industrial automation device 10. Inter-links between the IoT devices may refer to communication patterns between IoT devices of different levels of the industrial automation device 10. That is, an inter-link may exist between a data server of an enterprise network level and a manufacturing execution system (MES) of an operational and control network level.

Rather than evaluating quantifiable factors or metrics from the overall IoT network data pack, data related to the identified actors, the baseline truth, and other relevant data is sent to the metrics generator 64. The data reducer and joining component 62 aggregates the data related to the identified actors, the baseline truth, and other relevant data to be sent to the metrics generator 64. The data reducer and joining component 62 may then send other portions of the IoT network data that are not relevant to the identified actors and/or for identifying metrics to a cloud or database for storage.

The metrics generator 64 may include one or more processors related to a protocol association models 66 and metric extraction component 68. The protocol association models 66 may be built from the aggregation of interactor communication. That is, the protocol association models 66 may aggregate transaction information from sender to receiver to identify who an actor may communicate with during a specific time frame. The metrics generator 64 may determine communication patterns between the identified actors. For example, the metrics generator 64 may determine the type, duration, an amount of communication amongst the IoT devices, and the like. The protocol association models 66 may identify service protocols, transport level communication, network level, network interface, and so forth related to the identified actors and the baseline truth. The service protocols include identifying communication properties such as hypertext transfer protocol secure (HTTPS) and domain name system (DNS) for each identified actor. The transport level communication may include communication protocols such as transmission control protocol (TCP) and address resolution protocol (ARP). The transmission control protocol (TCP) may define how a network conversation through which identified actors (e.g., application programs) can exchange data via the network is maintained. Further, the address resolution protocol (ARP) may be used for discovering a link layer address, such as a MAC address associated with a given internet layer address for each identified actor. At the network level, the protocol association models 66 may determine the IP address, ARP, IPv6, and so forth associated with each identified actor. Further, the protocol association models 66 may determine the type of network interface (e.g., Ethernet) associated with each identified actor.

Identified data related to service protocols, transport level communication, network level properties, network interface, and the like may be sent to the metric extraction component 68. Using data related to identified actors, the baseline truth, and the identified data from the protocol association models 66, the metric extraction component 68 may extract metrics related to communication between the IoT devices from the baseline truth. Non-limiting examples of the metrics may include number of messages per unit time, time of communication, type of communication links, data volume, duration of communication, count (e.g., number of connections to the same host), source error rate, and destination error rate between identified actors. In certain embodiments, the metric extraction component 68 may export the extracted metrics as a report 84 with charts, graphs, and relevant data to a user 86 (e.g., human operators, security personnel, engineers of the industrial automation system 10).

The metrics generator 64 may store the metrics in a singular vector that is evaluated to determine variations in communication behaviors of identified actors by analyzing communication patterns and detecting outliers that originate from the variations. Based on identifying particular IoT devices and the metrics related to communication between the particular IoT devices, an actor model may be generated. The IoT network data from various IOT devices is organized, demultiplexed, and evaluated for metrics to develop the actor model. The actor model includes data related to the metrics, properties of the identified IoT devices, and the communication between the IoT devices. For example, the actor model includes properties such as IP address, MAC address, type of vendor, name of device, geolocation, and user role associated with each IoT device identified from the IoT network data. Further, the actor model includes communication information related to intra-links and inter-links between the identified IoT devices.

Further, using the actor model, the IoT devices and corresponding communication may be classified based on source nodes (e.g., transmitters of communication data), destination nodes (e.g., receivers of communication data), and edge activity. Properties of source nodes or IoT devices may include source MAC ID, source Ethernet address, source IP address, and so forth. Properties of destination nodes or IoT devices may include destination MAC ID, destination Ethernet address, destination IP address, and so forth. Further, edge activity may include communication protocol type, service, number of messages per second, data volume, duration of communication between a source node and a destination node. Aspects related to defining the actors may be added to the overall actor model incrementally, and depending on the context of various applications, such aspects may change in complexity and extent.

With the preceding in mind, the identified actor communication activity is translated into quantifiable factors (e.g., metrics) that are used to establish a social network model 70 and evaluate network entropy. The social network model 70 may define expected properties of the network communication amongst the IoT devices. Further, based on receiving the actor model as input, the social network model 70 is generated to include data related to overall communication patterns and trends between identified actors within the IoT system of the industrial automation system 10. A social network analyzer 72 may use the social network model 70 to detect anomalies within the network communication or variations from expected communication trends defined by the social network model 70.

Based on the social network model 70, the social network analyzer 72 may evaluate social network metrics 74 such as centrality, density, and modularity to analyze the interactions between the identified IoT devices (e.g., actors). Actors may participate in temporary communication within an actor group. The actor group may be calculated by social network metrics based on actor associations that help determine centrality. Actors may carry out various levels of communication with their peers, which tend to be repetitive and may help determine density. Determining modularity of a system may be based on formation of multiple social groups, in which some last longer than others in an observable set of patterns during production of products Density may indicate a potential of network connections between the identified IoT devices. Further, centrality may indicate which of the identified IoT devices are major actors within the network communication. In some embodiments, major actors may be selected based on the number of inter-links and intra-links associated with a particular actor. For example, a particular IoT device may be involved in a greater amount of communication within the IoT network compared to other IoT devices; thus, the IoT device may be designated as a major actor. Modularity may define the structure of the social network.

Density of the network communication may be calculated using the following formula:

$$\delta = \frac{m}{n(n-1)}$$

where: $m$ = Number of edges &

$n$ = Number of Nodes (Actors)

Centrality of the network communication may be calculated by dividing the sum of the network density by the number of nodes. Centrality may be computed using the following formula:

$$\text{Centrality} = \frac{\Sigma(\text{Network Density})}{\#\text{nodes}}$$

In addition to above social network metrics 74, entropy may also be evaluated. Entropy may be an overall social network metric calculation that includes the observed uncertainty within system communication. For example, entropy may indicate the level of uncertainty or uncharacteristic nature of the overall network communication.

Entropy of source IoT devices within the network communication may be calculated using the following formula:

$$H(srcIP) = -\sum_{i=1}^{m} \left(\frac{n_{si}}{Z_1}\right) \log_2\left(\frac{n_{si}}{Z_1}\right)$$

Where $Z_1 = \sum_{i=1}^{m} n_{si}$

Entropy of destination IoT devices within the network communication may be calculated using the following formula:

$$H(dstIP) = -\sum_{i=1}^{r} \left(\frac{n_{di}}{Z_2}\right) \log_2\left(\frac{n_{di}}{Z_2}\right)$$

Where $Z_2 = \sum_{i=1}^{r} n_{di}$

Using a time-series generator 76, the social network analyzer 72 may organize data related to entropy and other social network metrics 74 with respect to time using a time-series generator. Storing the organized data time-series database may provide improved querying operations for the data and improved trend analyses that may be used to detect anomalies. That is, by analyzing collected data with respect to particular time periods or operational statuses, the anomaly detection system 40 may correlate certain communication anomalies (e.g., slowdown, missing data packets) of certain identified IoT devices to certain social network metrics (e.g., level of entropy greater than expected entropy) The common time-based storage of collected data, which may include social network metric data as well as log data, may allow the anomaly detection system 40 to correlate detected anomalies to other data points stored in the time series database to better ascertain a possible cause for the detected anomalies that may be related to potential network vulnerabilities.

In turn, using the time-series data, the social network analyzer 72 may generate a state-space model 78 using machine learning algorithms to identify time-series patterns (e.g., network communication and behaviors of the identified IoT devices during particular time periods) and forecast information, which may be used to detect present anomalies and predict future anomalies. For example, based on analyzing entropy of the network communication, the social network analyzer 72 may indicate a change to the network communication that result in the network communication deviating from the expected properties of the social network model. As such, the social network analyzer 72 may flag this variation as an anomaly.

As used herein, the social network analyzer 72 may include machine learning circuitry. The machine learning circuitry may include any suitable processor that runs software to perform machine learning on the clean data to determine correlations and trends from the clean data. Because the original data is sourced from a multitude of diverse online services and databases, new data patterns not previously attainable may emerge. As used herein, machine learning may refer to algorithms and statistical models that computer systems use to perform a specific task with or without using explicit instructions. For example, a machine learning process may generate a mathematical model based on a sample of data in order to make predictions or decisions without being explicitly programmed to perform the task.

To detect anomalies dynamically without relying on historical sets of data, it may be beneficial for the machine-learning circuitry to utilize unsupervised learning (e.g., when particular output types are not known). Unsupervised learning algorithms take a set of data that contains only inputs, and find structure in the data, like grouping or clustering of data points. The algorithms, therefore, learn from test data that may not be labeled, classified or categorized. Instead of responding to feedback, unsupervised learning algorithms identify commonalities in the data and react based on the presence or absence of such commonalities in each new piece of data.

Cluster analysis is the assignment of a set of observations into subsets (called clusters) so that observations within the same cluster are similar according to one or more predesignated criteria, while observations drawn from different clusters are dissimilar. Different clustering techniques make different assumptions on the structure of the data, often defined by some similarity metric and evaluated, for example, by internal compactness, or the similarity between members of the same cluster, and separation, the difference between clusters.

The social network analyzer 72 may use a Kalman filter (reward-based learning) as an example unsupervised machine learning algorithm provides estimates of some unknown variables given the measurements observed over time (e.g., time series data). In other embodiments, the social network analyzer 72 may use network clustering consistency to calculate a silhouette coefficient that indicates data drift, anomalies, and/or outliers in the network communication.

The social network analyzer 72 may calculate the silhouette coefficient of the network communication using the following formula:

Silhouette Coefficient $$SCI=(b_i-a_i)/\max(a_i,b_i)$$

where a$_i$=average distance from point i to the other members of same cluster b$_i$=average distance from point i to members of adjacent cluster Using the machine-learning driven state-space model 78, the social network analyzer 72 may detect anomalies based on variations in network communication compared to the expected properties of the social network model 70. The social network analyzer 72 may notify the user 86 regarding the anomalies via a notification 82 and a report 84 sent to user devices (e.g., smartphone). The report 84 may include a summary, charts, graphs, graphical representations, and the like associated with the detected anomalies.

Based on analyzing the anomalies, in some embodiments, the user may determine whether one or more identifies anomalies are associated with an external network threat, a network vulnerability, internal issue within the industrial automation system, and so forth. The anomaly detection system 40 aides the user in understanding the origin of the anomalies to make accurate decisions to address potential network issues associated with the identified anomalies. The user may flag an anomaly as a network vulnerability based on analyzing the social network metrics and the identified actor associated with the anomaly. For example, the social network analyzer 72 may have flagged the anomaly due to identifying a communication signature associated with an unregistered or uncertified device within the industrial automation system 10. After receiving the notification 82 of a detected anomaly from the social network analyzer 72, the user 86 may verify the unregistered device is unauthorized to operate within the industrial automation system 10. The user 86 may determine the detected anomaly is indeed associated with a network vulnerability or security threat. As such, to thwart the security threat, the user 86 may disable access of the unregistered device to the industrial automation device 10 by using information such as the actors to the detected anomaly from the anomaly detection system 40.

In additional and/or alternative embodiments, the user 86 may input annotations associated with detected anomalies into the anomaly detection system 40. The annotations may include user notes, decisions, commands, and the like for analyzing and addressing particular anomalies. As annotations for various anomalies accumulate over time, the anomaly detection system 40 may automatically identify and/or address potential network issues rather than the user 86. For example, if an unregistered device attempts accessing the industrial automation system 10, the anomaly detection system 40 may automatically disable access of the unregistered device to the industrial automation system 10 based on a previous annotation for addressing the same detected anomaly. The previous annotation for the detected anomaly may identify the detected anomaly as a security threat and indicate that disabling the unregistered device is the appropriate resolution for the threat.

In some embodiments, the anomaly detection system 40 may also predict anomalies using an anomaly prediction tool 80 by analyzing social network metrics and entropy to estimate any future variation in network communication. By determining an uncharacteristic nature of the network communication relative to the social network model, the anomaly prediction tool 80 may forecast potential anomalies. The anomaly detection system 40 may notify the user 86 regarding the predicted anomalies such that the predicted anomalies may be addressed before the IoT system may encounter potential data breaches or security issues due to the predicted anomalies in the network communication.

The anomaly prediction tool 80 may use deep learning such as long short-term memory (LSTM) to forecast time-series patterns in communication data between identified actors to predict anomalies. For example, the anomaly prediction tool 80 may use previous communication data or values from the state-space model 78 to predict communication behavior for the next period of time (e.g., next minute, next hour)

The state-space model 78 may be updated in response to the anomaly detection system 40 receiving new communication data and identifying new network communication patterns and behavior. Continuously updating the state-space model 78 as new network communication patterns are identified may improve forecast accuracy in detecting anomalies and potential network vulnerabilities. Machine-based processing of the anomaly detection system 40 may provide insight that may not be attained via human estimating, by relying on complex data patterns/relationships that may not be conceived in the human mind.

Figure 3:
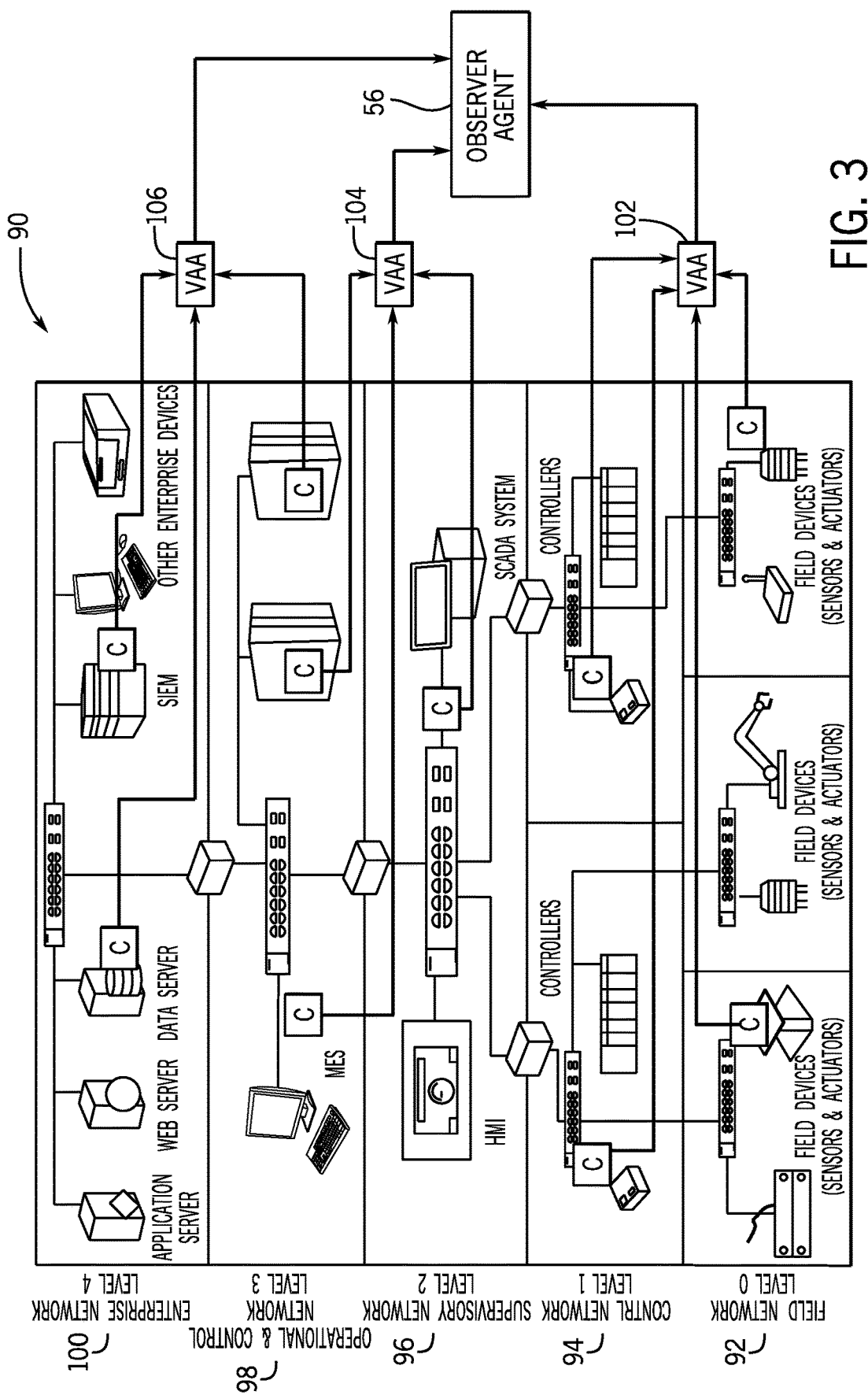
FIG. 3 illustrates a schematic diagram of vulnerability analytics agents (VAAs) within the anomaly detection system of FIG. 2, according to one embodiment.

As mentioned above, the industrial automation system 10 includes various levels of operation in which IoT devices may be disposed. FIG. 3, for example, is a schematic diagram 90 of the various levels that are coupled to vulnerability analytics agents (VAAs). The hierarchical levels, in which the industrial automation system 10 may operate, include a field network level 92, a control network level 94, a supervisory network level 96, an operational and control level 98, and an enterprise network level 100. Different control systems, controllers, software applications, devices, and computing systems may operate with each other within an enterprise to enable organizations to effectively control operations of components in the industrial automation system 10. For example, the physical process in which industrial components (e.g., machines) are employed to physically modify raw materials may be part of the physical process level, which may be controlled or monitored by components in an intelligent device level. The intelligent device level may include sensors, analyzers, actuators, and other instrumentation that may sense and manipulate the physical process. The industrial components at both the physical process level and the intelligent device level may be a part of the field network level 92. The field network level 92 involves the actual production process of transforming raw materials (e.g., grains, wheat) into products (e.g., cereal) as well as sensing and manipulating the production process within the industrial automation system 10 (e.g., food manufacturing plant).

The control network level 94 may be positioned at a higher hierarchical level with respect to field network level 92. The control network level 94 may include controllers to provide supervising, monitoring, and controlling operations (e.g., continuous control, discrete control) for the physical process associated with the industrial components.

The supervisory network level 96 may be positioned at a higher hierarchical level with respect to the control network level 94 that regulates the controllers of the control network level 94. By way of example, the supervisory network level 96 may include real-time control hardware and software, HMI, programmable logic controller (PLC), supervisory and data acquisition (SCADA) software, and the like. The PLC may be an industrial solid-state computer that monitors inputs and outputs of the industrial automation system 10 and makes logic-based decisions for automated processes of the industrial automation system 10. Further, the SCADA may analyze real or near real-time data from industrial components 62 and subsequently control the industrial components.

The operational and control level 98 may be positioned at a higher hierarchal level with respect to the supervisory network level 96. The operational and control level 98 may include manufacturing application system, which may any suitable IoT system that supports manufacturing processes. In some embodiments, the manufacturing application system may include manufacturing execution system (MES) or a manufacturing operations management (MOM) that manage production workflow to produce the desired products, batch management, laboratory, maintenance and plant performance management systems, data historians, related middleware, and the like. The MES and MOM may involve monitoring data with respect to various time frames, such as duration of communication between components, minutes, seconds, and the like.

In particular, the MES may include a number of software and hardware components that operate together to monitor the operations of the various components (e.g., databases, servers, devices) that are used to perform the manufacturing operations. The infrastructure of the manufacturing applications system may include the software and hardware components that control the distribution of data and information between various components in the manufacturing application system level and other levels discussed above. By way of example, the components of the manufacturing application system may include a server, a database, a database server, an application server, network controllers, routers, interfaces, and the like. In addition, the components of the manufacturing application system may include software applications and processes that operate to control the flow of data and information between the various components employed by the manufacturing applications systems.

Positioned above the operational and control level 98, the enterprise network level 100 may manage business-related activities of the manufacturing operation. For instance, the enterprise network level 100 may establish production schedule, material use, shipping, and inventory levels to support the operations monitored by the components (e.g., databases, servers) in the operational and control level 98. The enterprise network level 100 may also include application servers, web servers, data servers, security information and event management (SIEM), and other enterprise devices.

As mentioned above, each vulnerability analytics agent (VAA) is a data collecting component that may collect communication data and signatures from one or more IoT devices of the hierarchical levels of the industrial automation system 10. For example, vulnerability analytics agent (VAA) 102 may collect communication data for each IoT device within the field network level 92 and the control network level 94. Vulnerability analytics agent (VAA) 104 may collect communication data for each IoT device within the supervisory network level 96 and the operational and control level 98. Further, vulnerability analytics agent (VAA) 106 may collect communication data for each IoT device within the operational and control level 98 and the enterprise network level 100.

The vulnerabilities analytics agents (VAAs) 102, 104, and 106 may be coupled to the observer agent 56 that receives the communication data and signatures collected by the vulnerabilities analytics agents (VAAs) 102, 104, and 106. The communication data and signatures communication may indicate interactions between various IoT devices and nodes within the various levels within the industrial automation system 10.

Figure 4:
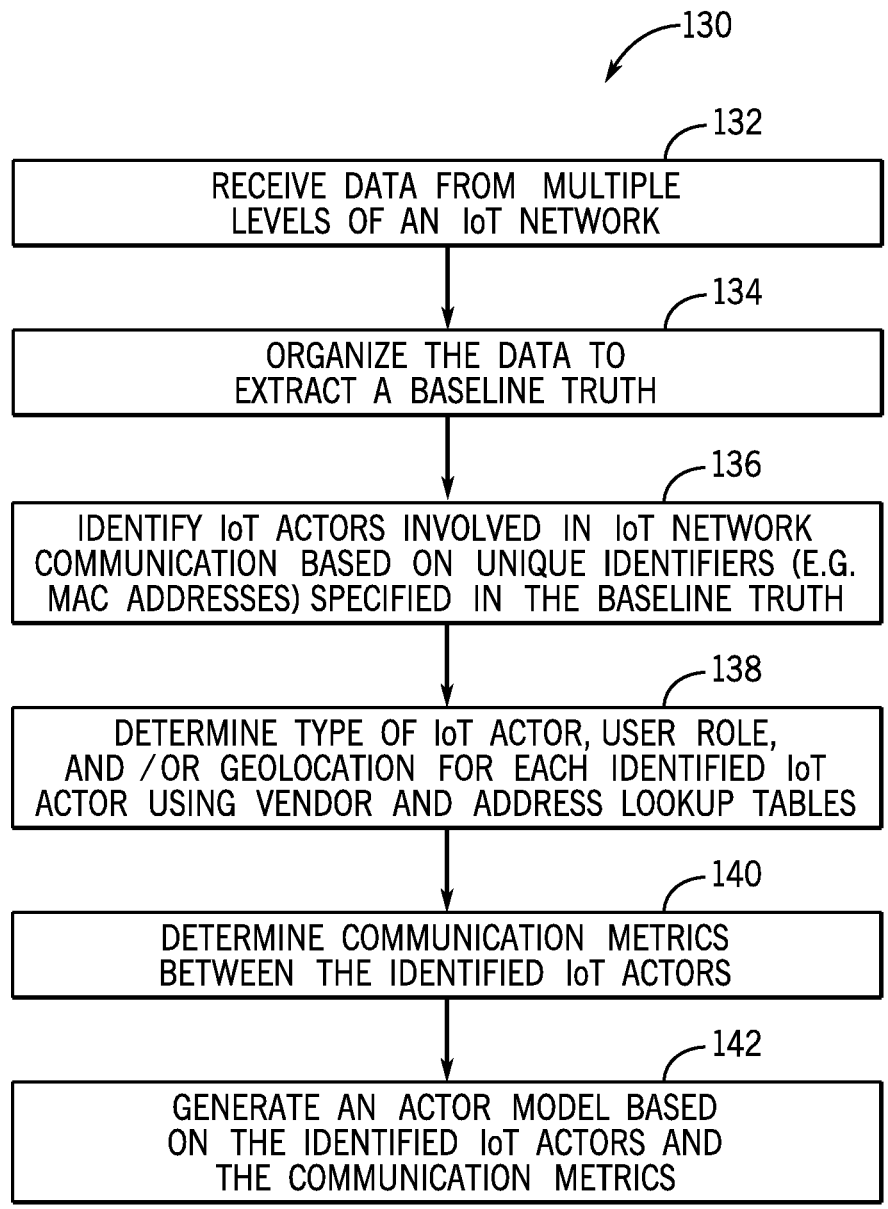
FIG. 4 illustrates a flow chart of a process for generating an actor model based on the vulnerability analytics agents of FIG. 2, according to one embodiment.

As described in detail above in FIGS. 2 and 3, the observer agent 56 identifies individual IoT actors within the network communication using the communication data received from the. Using communication data and metrics from the observer agent 56 and the metrics generator 64, the anomaly detection system 40 generates an actor model that is representative of the individual IoT actors and communication metrics between the individual IoT actors. As such, FIG. 4 is a flow chart of a process 130 for generating an actor model. The process 130 may be performed by any suitable device such as the anomaly detection system 40. While the process 130 is described using steps in a specific sequence, it should be understood that the present disclosure contemplates that the described steps may be performed in different sequences than the sequence illustrated, and certain described steps may be skipped or not performed altogether. In some embodiments, the process 130 may be implemented by executing instructions stored in a tangible, non-transitory, computer-readable medium within the anomaly detection system 40.

The anomaly detection system 40 receives network communication data from various hierarchical levels as described in FIG. 3 from an IoT network of the industrial automation system (block 132). As mentioned above, the network communication data includes information related to the communication and interactions between various IoT devices and nodes within the various levels of the IoT system within the industrial automation system 10. Further, vulnerabilities analytics agents (VAAs) 102, 104, and 106 may be strategically located throughout the hierarchical levels of the industrial automation system 10 to collect the network communication data from the various IoT devices and nodes.

After receiving the network communication data, the anomaly detection system 40 may organize the network communication data to extract a baseline truth (block 134) for deducting relationships and communication network patterns. The baseline truth may include communication trends or patterns identified amongst IoT devices from the network communication data.

In addition to the baseline truth, the anomaly detection system 40 may identify one or more actors involved in the network communication based on respective unique identifiers (e.g., MAC addresses) specified in the baseline truth (block 136). The anomaly detection system 40 may separate various communication signals or signatures from the baseline truth into to their corresponding actors (e.g., receivers, transmitters) using the lookup tables 54. Using an address lookup table, the anomaly detection system 40 may identity a MAC address for a particular communication signature.

Additionally, the anomaly detection system 40 may identity a type of device, user role, and/or geolocation associated with the particular communication signature using the identified MAC address, a device registry 114, and/or vendor lookup table 54 (block 138). For example, the anomaly detection system 40 may identify that a particular IoT device is a controller, a PC device, or so forth based on correlating a type of device from the device registry to the identified MAC address. Further, the anomaly detection system 40 may determine which user access the identified IoT device during a particular time period.

Using data related to identified actors, the anomaly detection system 40 may extract metrics related to communication between the IoT devices from the baseline truth (block 140). Non-limiting examples of the metrics may include number of messages per unit time, time of communication, type of communication links, data volume, duration of communication, count (e.g., number of connections to the same host), source error rate, and destination error rate between identified actors.

Based on identifying particular IoT devices and the metrics related to communication between the particular IoT devices, the anomaly detection system 40 generates an actor model (block 142). For example, the actor model may include the extracted metrics described above properties such as IP address, MAC address, type of vendor, name of device, geolocation, and user role associated with each IoT device identified. Further, the actor model includes communication information related to intra-links and inter-links between the identified IoT devices.

Figure 5:
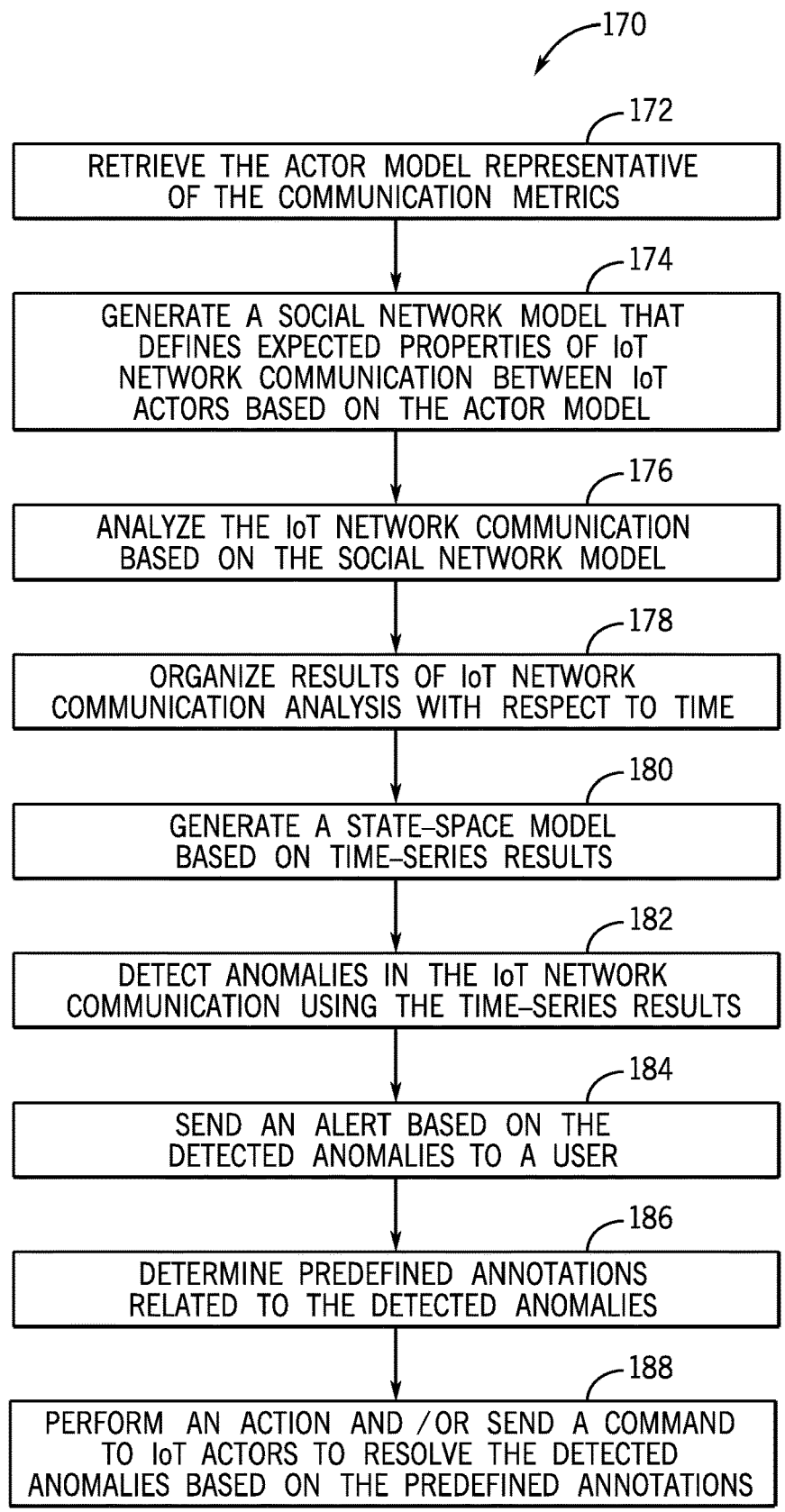
FIG. 5 illustrates a flow chart of a process for generating a social network model based on the actor model of FIG. 4, according to one embodiment.

Using the actor model, the anomaly detection system 40 may generate a social network model. As such, FIG. 5 illustrates a flow chart of a process 170 for generating a social network model based on actor models for various devices. The process 170 may be performed by any suitable device such as the anomaly detection system 40. While the process 170 is described using steps in a specific sequence, it should be understood that the present disclosure contemplates that the described steps may be performed in different sequences than the sequence illustrated, and certain described steps may be skipped or not performed altogether. In some embodiments, the process 130 may be implemented by executing instructions stored in a tangible, non-transitory, computer-readable medium within the anomaly detection system 40.

At block 172, the anomaly detection system 40 may retrieve the actor models from a storage component, a database, or the like. The actor models may be representative of the identified IoT devices and corresponding communication metrics.

Based on the actor models, the anomaly detection system 40 may generates the social network model 70 (block 174). The social network model 70 may be representative of the expected properties of network communication between identified IoT devices based on the actor model.

The anomaly detection system 40 may analyze the social network model 70 using social network metrics such as centrality, density, and modularity to analyze the interactions between the identified IoT devices (block 176). Further, the anomaly detection system 40 evaluate the overall entropy, which indicates the level of uncertainty or uncharacteristic nature of the network communication.

In turn, the anomaly detection system 40 organized the results from the analysis of the social network metrics 74 and overall entropy of the network communication with respect to time to provide ease in identifying additional communication patterns (block 178).

Using the time-series results, the anomaly detection system 40 may generate the state-space 78 model based on machine learning algorithms (block 180) to identify time-series patterns (e.g., network communication and behaviors of the identified IoT devices during particular time periods) and forecast information, which may be used to detect present anomalies and predict future anomalies. As mentioned above, the state-space model may be continuously updated to incorporate and learn from new communication patterns, new anomalies, and new inputs from the user 86.

In some embodiments, after detecting an anomaly, the anomaly detection system 40 may alert the user 86 (block 184). The user 86 may determine whether the anomaly is associated with an external network threat, a network vulnerability, internal issue within the industrial automation system and so forth. The network vulnerability may be related to a safety issue, a security issue, and/or a data quality issue.

An example security issue associated with a detected anomaly may involve the user 86 being notified of relevant information (e.g., identified IoT devices, communication metrics, entropy level) related to the detected anomaly. The user 86 may learn from the relevant information that the detected anomaly is associated with an unregistered device. In turn, the user 86 may verify the unregistered device is indeed unauthorized to operate within the industrial automation system 10. As such, to thwart the security threat, the user 86 may itself disable or send a command to the anomaly detection system 40 to disable access of the unregistered device to the industrial automation device 10.

Although described above as being related to network anomalies, it should be noted that the anomaly detection system 40 may also detect anomalies related to any type of anomaly. For example, an alarm may be triggered inadvertently within the field network level 92 that may cause streams of communication messages related to the alarm to be communicated to supervisory devices, relays, protection coordination system, and the like. Such streams of communication may increase overall entropy of network communication and may deviate from the expected network communication properties defined by the social network model 70. As such, the anomaly detection system 40 may flag this detected anomaly and determine whether an annotation is associated with the anomaly. That is, the user may annotate the anomaly as being related to a safety issue in view of the increased communications to the supervisory devices, the relays, the protection coordination system, and the like. Over time, after receiving multiple similar types of anomalies and annotations, the anomaly detection system 40 may automatically evaluate evaluates the anomaly and classify the anomaly as a safety issue based on the annotations. In some embodiments, the annotations may include instructions with regard to addressing such a safety issue, such as sending commands to other components to adjust operational states (e.g., open circuit breakers), send alerts to certain personnel, rebooting the IoT system, or the like.

In addition to safety issues, detected anomalies may be related to data quality issues. For example, data quality packets such as missing data packets or slower communication of data may cause the anomaly detection system 40 to detect an anomaly. In some instances, the anomaly detection system 40 may be unable to identify the anomaly as a data quality issue. As such, after being notified, the user 86 may annotate the anomaly as a data quality issue and instruct the anomaly detection system 40 on how to resolve the data quality issue.

In additional and/or alternative embodiments, the user 86 may input annotations associated with detected anomalies into the anomaly detection system 40. The annotation are user notes, decisions, commands, and the like for analyzing and addressing particular anomalies. As annotations for various anomalies are dynamically accumulated over time, the anomaly detection system 40 may identify and/or address potential network issues rather than the user 86. For example, the anomaly detection system 40 may determine whether predefined annotations (e.g., annotations received from the user 86 for previous anomalies that correlate with the present detected anomalies) related to the detected anomalies exist from the accumulated annotations (block 186).

After determining the presence of predefined anomalies, the anomaly detection system may perform action(s) based on the predefined annotations to resolve potential issues (e.g., network issue, safety issue, data quality issue) associated with the detected anomalies (block 188). For example, the predefined annotations may include instructions with regard to addressing the network, safety, and/or data quality issue, such as sending commands to other IoT devices to adjust operational states, sending alerts to certain personnel, rebooting the IoT system, or the like. In some embodiments, based on learning from the accumulated annotations, the anomaly detection system 40 may resolved potential issues associated with any detected anomalies without user instructions.

In some embodiments, the anomaly detection system 40 also predicts anomalies by analyzing social network metrics and entropy to estimate any future variation in network communication. By determining an uncharacteristic nature of the network communication relative to the social network model, the anomaly prediction tool 80 may forecast potential anomalies. The anomaly detection system 40 may notify the user 86 regarding the predicted anomalies such that the predicted anomalies may be addressed before the IoT system may encounter potential data breaches or security issues due to the predicted anomalies in the network communication.

Figure 6:
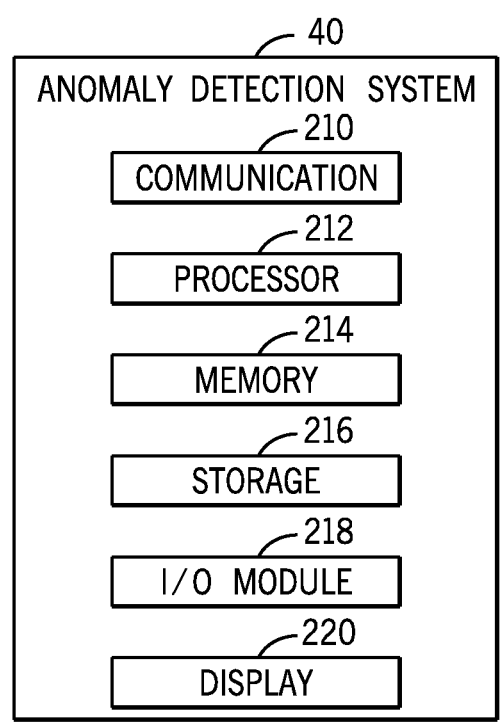
FIG. 6 illustrates example elements that are a part of the anomaly detection system in the industrial automation system, according to one embodiment.

With the preceding in mind, FIG. 6 illustrates example elements that may be part of the anomaly detection system 40, in accordance with embodiments presented herein. For example, the anomaly detection system 40 may include a communication component 210, a processor 212, a memory 214, a storage 216, input/output (I/O) module 218, a display 220, and the like. The communication component 210 may be a wireless or wired communication component that may facilitate communication between the anomaly detection system 40 and other electronic devices (e.g., user devices).

The memory 214 and the storage 216 may be any suitable articles of manufacture that can serve as media to store processor-executable code, data, or the like. These articles of manufacture may represent computer-readable media (i.e., any suitable form of memory or storage) that may store the processor-executable code used by the processor 212 to perform the presently disclosed techniques. In some embodiments, the memory 214 may include a volatile data storage unit, such as a random-access memory (RAM) and the storage 216 may include a non-volatile data storage unit, such as a hard disk. The memory 214 and the storage 216 may also be used to store the data, analysis of the data, and the like. The memory 214 and the storage 216 may represent non-transitory computer-readable media (i.e., any suitable form of memory or storage) that may store the processor-executable code used by the processor 212 to perform various techniques described herein. It should be noted that non-transitory merely indicates that the media is tangible and not a signal.

The anomaly detection system 40 may also include the input/output (I/O) module 218. The I/O module 112 may enable the anomaly detection system 40 to communicate with various IoT devices in the industrial automation system 10. Input/output (I/O) module 218 may be added or removed from the anomaly detection system 40 via expansion slots, bays, or other suitable mechanisms. In certain embodiments, the I/O modules 218 may be included to add functionality to the anomaly detection system 40, or to accommodate additional process features. It should be noted that the I/O modules 218 may communicate directly to IoT devices of the industrial automation system 10 or may communicate through wired or wireless sensor networks, such as Hart or IOLink.

Generally, the I/O modules 218 serve as an electrical interface to the anomaly detection system 40 and may be located proximate or remote from the anomaly detection system 40, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, Ethernet/IP, and so forth), ControlNet, DeviceNet or other network protocols (Foundation Fieldbus (H1 and Fast Ethernet) Modbus TCP, Profibus) and also communicate to higher level computing systems. Several of the I/O modules 218 may transfer input and output signals between anomaly detection system 40 and the IoT devices.

The anomaly detection system 40 may be equipped with the display 220. The display may provide a user with information about the data received via the communication component 210. The information may include data received from the anomaly detection system 40 and may be associated with various IoT devices. The display 220 may also be used by a user to provide input to the anomaly detection system 40, such as defining data models with the respective data structures querying for specific communication data to be collected from the various IoT devices of the industrial automation system 10, among other things.

The anomaly detection system 40 may be implemented as a single computing system or multiple computing systems. The computing systems associated with the anomaly detection system 40 may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe the anomaly detection system 40 as a physical device, implementations are not so limited. In some examples, the anomaly detection system 40 may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure. The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A non-transitory computer-readable medium, comprising computer-executable instructions that, when executed by one or more processors, cause the one or more processors to:
receive data associated with network communication from a plurality of devices in an industrial automation system;
identify one or more communication patterns within the network communication based on the data;
identify one or more devices of the plurality of devices based on one or more identifiers associated with the one or more communication patterns;
determine one or more communication metrics associated with each device of the one or more devices using the one or more communication patterns, wherein the one or more communication metrics comprise a number of messages per unit time, a data volume, a duration of communication, a number of connections to the one or more devices, a source error rate, or a destination error rate;
generate an actor model based on the one or more communication patterns and the one or more communication metrics, wherein the actor model comprises expected communication metrics of each device of the one or more devices;
generate a network model based on the actor model, wherein the network model comprises a plurality of expected properties of the network communication relative to the expected communication metrics of each device of the one or more devices, wherein the plurality of expected properties of the network communication comprises a density component, a centrality component, a modularity component, and an entropy component, and wherein the density component is associated with a determined respective amount of repetitive communications of each device of the one or more devices based on the expected communication metrics, the centrality component is associated with a determined respective amount of communications of each device of the one or more devices with respect to a threshold amount of communications determined based on the expected communication metrics, the modularity component is associated with a determined formation of one or more interaction-based groups of two or more devices of the one or more devices in a set pattern based on the expected communication metrics, and the entropy component is associated with a determined level of uncertainty associated with communications between the one or more devices based on the expected communication metrics;
generate, using machine learning, a state-space model comprising a plurality of time-series patterns based on the plurality of expected properties of the network communication of the network model with respect to time;
receive additional data associated with the network communication from the plurality of devices in the industrial automation system after receiving the data;
detect one or more anomalies in the network communication based on a comparison between one or more network metrics associated with the additional data and the state-space model; and
send a notification to a computing device in response to detecting the one or more anomalies.

2. The non-transitory computer-readable medium of claim 1, wherein the computer-executable instructions are configured to cause the one or more processors to:
receive an input from the computing device, wherein the input is indicative of:
a first anomaly of the one or more anomalies as a network vulnerability; and
a command configured to prevent a first device of the plurality of devices from accessing the network communication, wherein the first device is associated with the first anomaly; and
dynamically update the state-space model based on the input.

3. The non-transitory computer-readable medium of claim 1, wherein the computer-executable instructions cause the one or more processors to:
classify a first anomaly of the one or more anomalies as a network vulnerability based on a correlation between the first anomaly and a second anomaly part of the state-space model; and
send a command configured to prevent a first device of the plurality of devices from accessing the network communication, wherein the first device is associated with the first anomaly.

4. The non-transitory computer-readable medium of claim 1, wherein the one or more identifiers comprise one or more MAC addresses, one or more IP addresses, one or more types of devices, one or more user roles, one or more geolocations, or any combination thereof.

5. The non-transitory computer-readable medium of claim 1, wherein the computer-executable instructions are configured to cause the one or more processors to receive one or more annotations from the computing device, wherein the one or more annotations comprise one or more commands configured to prevent a first device of the plurality of devices from accessing the network communication.

6. The non-transitory computer-readable medium of claim 5, wherein the one or more commands are configured to cause the first device to open, wherein the first device comprises a circuit breaker.

7. The non-transitory computer-readable medium of claim 1, wherein the computer-executable instructions are configured to cause the one or more processors to retrieve at least one annotation associated with the one or more anomalies, wherein the at least one annotation corresponds to one or more commands configured to adjust a first operation of a first device of the plurality of devices.

8. The non-transitory computer-readable medium of claim 7, wherein the at least one annotation is previously provided by a user for a previously detected anomaly similar to at least one anomaly of the one or more anomalies.

9. A method, comprising:
receiving, via a processor, data associated with network communication from a plurality of devices in an industrial automation system;
identifying, via the processor, one or more communication patterns within the network communication based on the data;
identifying, via the processor, one or more devices of the plurality of devices based on one or more identifiers associated with the one or more communication patterns;
determining, via the processor, one or more communication metrics associated with each device of the one or more devices using the one or more communication patterns, wherein the one or more communication metrics are associated with communication links, data volume, time of communication, or duration of communication;

generating, via the processor, an actor model based on the one or more communication patterns and the one or more communication metrics, wherein the actor model comprises expected communication metrics of each device of the one or more devices;

generating, via the processor, a network model based on the actor model, wherein the network model comprises a plurality of expected properties of the network communication relative to the expected communication metrics of each device of the one or more devices, wherein the plurality of expected properties of the network communication comprises a density component, a centrality component, a modularity component, and an entropy component, and wherein the density component is associated with a determined respective amount of repetitive communications of each device of the one or more devices based on the expected communication metrics, the centrality component is associated with a determined respective amount of communications of each device of the one or more devices with respect to a threshold amount of communications determined based on the expected communication metrics, the modularity component is associated with a determined formation of one or more interaction-based groups of two or more devices of the one or more devices in a set pattern based on the expected communication metrics, and the entropy component is associated with a determined level of uncertainty associated with communications between the one or more devices based on the expected communication metrics;

generate, via the processor and using machine learning, a state-space model comprising a plurality of time-series patterns based on the plurality of expected properties of the network communication of the network model with respect to time;

receiving, via the processor, additional data associated with the network communication from the plurality of devices in the industrial automation system after receiving the data;

detecting, via the processor, one or more anomalies in the network communication based on a comparison between one or more network metrics associated with the additional data and the state-space model; and sending, via the processor, a notification to a computing device in response to detecting the one or more anomalies.

10. The method of claim 9, comprising receiving one or more annotations from the computing device, wherein the one or more annotations comprise one or more indications of one or more types of the one or more anomalies.

11. The method of claim 10, wherein the one or more types corresponds to a safety threat, a network threat, a data quality issue, or any combination thereof.

12. The method of claim 9, comprising receiving one or more annotations from the computing device, wherein the one or more annotations comprise one or more commands configured to prevent a first device of the plurality of devices from accessing the network communication.

13. The method of claim 12, wherein the one or more commands are configured to cause the first device to open, wherein the first device comprises a circuit breaker.

14. The method of claim 9, wherein the one or more identifiers comprise one or more MAC addresses, one or more IP addresses, one or more types of devices, one or more user roles, one or more geolocations, or any combination thereof.

15. The method of claim 9, wherein the one or more communication metrics comprise a number of messages per unit time, a data volume, a duration of communication, a number of connections to the one or more devices, a source error rate, a destination error rate, or any combination thereof.

16. A non-transitory computer-readable medium, comprising computer- executable instructions that, when executed by one or more processors, cause the one or more processors to:

identify one or more communication patterns within network communication between a plurality of devices in an industrial automation system based on data associated with the network communication;

determine one or more communication metrics associated with the plurality of devices using the one or more communication patterns, wherein the one or more communication metrics comprise a number of messages per unit time, a data volume, a duration of communication, a number of connections to the plurality of devices, a source error rate, or a destination error rate;

generate an actor model based on the one or more communication patterns and the one or more communication metrics, wherein the actor model comprises expected communication metrics of the plurality of devices;

generate a network model based on the actor model, wherein the network model comprises a plurality of expected properties of the network communication relative to the expected communication metrics of the plurality of devices, wherein the plurality of expected properties of the network communication a density component, a centrality component, a modularity component, and an entropy component, and wherein the density component is associated with a determined respective amount of repetitive communications of each device of the plurality of devices based on the expected communication metrics, the centrality component is associated with a determined respective amount of communications of each device of the plurality of devices with respect to a threshold amount of communications determined based on the expected communication metrics, the modularity component is associated with a determined formation of one or more interaction-based groups of the plurality of devices in a set pattern based on the expected communication metrics, and the entropy component is associated with a determined level of uncertainty associated with communications between the plurality of devices based on the expected communication metrics;

generate, using machine learning, a state-space model comprising a plurality of time-series patterns based on the plurality of expected properties of the network communication of the network model with respect to time;

receive additional data associated with the network communication from the plurality of devices in the industrial automation system;

identify one or more anomalies within the additional data based on a comparison between the additional data and the state-space model;

retrieve at least one annotation associated with the one or more anomalies, wherein the at least one annotation corresponds to one or more commands configured to adjust a first operation of a first device of the plurality of devices; and send the one or more commands to the first device.

17. The non-transitory computer-readable medium of claim 16, wherein the at least one annotation is previously provided by at least one user for at least one anomaly similar to the one or more anomalies.

18. The non-transitory computer-readable medium of claim 16, wherein the at least one annotation for the one or more anomalies corresponds to a type of anomaly.

19. The non-transitory computer-readable medium of claim 18, wherein the type of anomaly corresponds to a safety anomaly, a network threat anomaly, or a data quality anomaly.

20. The non-transitory computer-readable medium of claim 16, wherein the one or more commands are configured to cause the first industrial automation component device-to open, wherein the first industrial automation component comprises a circuit breaker.

* * * * *